T. Vandeventer.
Paper Mach.
Nº 26,387. Patented Dec. 6, 1859.

Witnesses
Charles M. Hughes
Mich Hughes

Inventor;
Theo Van Deventer

UNITED STATES PATENT OFFICE.

T. VAN DEVENTER, OF NEW BRUNSWICK, NEW JERSEY.

ROLLER FOR PRINTING PAPER HANGINGS.

Specification of Letters Patent No. 26,387, dated December 6, 1859.

*To all whom it may concern:*

Be it known that I, THEODORE VAN DEVENTER, of New Brunswick, in the county of Middlesex and State of New Jersey, have invented a new and useful Improvement in Rollers for Printing Paper Hangings; and I do hereby declare that the following is a full, clear, and exact description of the same, reference being had to the accompanying drawings, forming part of this specification, in which—

Figure 2:
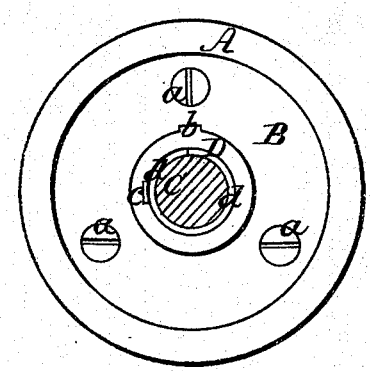
Figure 1:
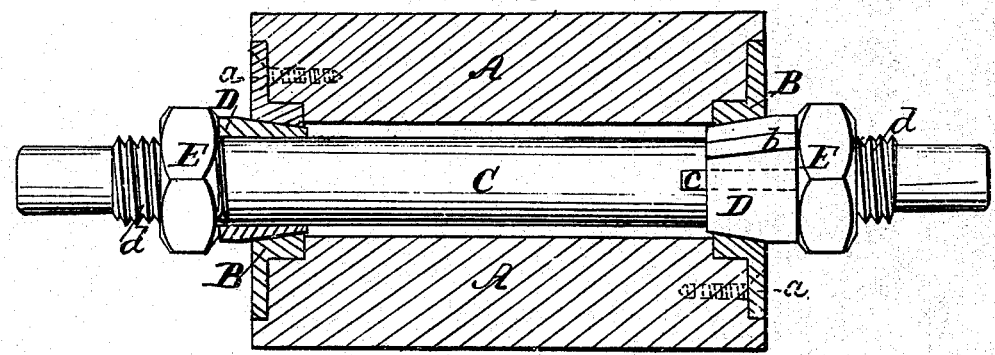

Figure 1, exhibits a longitudinal view of a roller and shaft illustrating my invention, the roller being in section and the shaft entire. Fig. 2, exhibits an end view of the roller and a transverse section of the shaft close to the roller.

Similar letters of reference indicate corresponding parts in the several figures.

The printing rollers employed in the manufacture of paper hangings by machinery are commonly made of wood, and one shaft is made to serve for several rollers of different patterns which are changed as occasion may require, and much difficulty has been experienced in so fitting and securing the rollers that they may be removed and replaced as often as desired and always be perfectly concentric with the shaft.

The object of my invention is to overcome this difficulty and to this end my invention consists in a certain combination of conically bored bushes fitted into the ends of the rollers, conical sliding collars fitted with feathers and grooves both to shaft and bushes, and nuts fitted to screw threads on the shaft, by which the truth of the several rollers upon the shaft is insured, and provision is made for adjusting the rollers lengthwise upon the shaft.

To enable others to make and use my invention I will proceed to describe its construction and operation.

A, is the wooden body of the roller bored throughout larger than the shaft C.

B, B, are two conically bored bushes made of cast iron or other suitable metal fitted into cavities provided for them in the ends of the body A, and permanently secured therein by screws *a, a*. The periphery of the roller is turned perfectly concentric to the bores of the bushes.

D, D, are two collars bored out cylindrically to fit the shaft and turned and finished externally to a conical form to fit the bushes B, B. Each of the said collars is furnished externally with a feather *b*, to fit a groove in one of the bushes, and is furnished inside with a groove to fit a feather *c*, on the shaft, by which means the roller is prevented turning on the shaft.

E, E, are two nuts fitted to screw threads *d, d*, cut on the shaft and serving to screw up the conical collars into the bushes and secure the roller to the shaft. The portion of the shaft between the screw threads *d, d*, which receives the collars D, D, is turned perfectly true and the length of such portion is so much less than the distance between the outer faces of the two collars when the latter are in their places as to permit of some longitudinal adjustment of the roller on the shaft by means of the nuts. This longitudinal adjustment does not interfere with the concentricity of the roller with the shaft.

By this mode of fitting and securing the rollers to the shaft, every roller, provided the bores of its bushes have the proper taper and the collars D, D, fit the shaft, will be sure to be concentric to the shaft when the collars are screwed up by the nuts, notwithstanding the bores of the bushes may vary somewhat in size, and this taken in connection with the provision for adjustment of the roller lengthwise of the shaft constitutes the advantage of the invention over all previous modes of securing wooden rollers on shafts.

I do not claim separately the fitting the body of the roller with bushes to receive a shaft, nor the use of cones upon the shaft, nor the use of feathers and grooves; but

What I claim as my invention and desire to secure by Letters Patent is—

The combination of the conically bored and grooved bushes B, the conical feathered collars D, D, the feathered and screwed shaft C, and the nuts E, E, the whole applied and operating as herein described.

THEO. VAN DEVENTER.

Witnesses:
MICH HUGHES,
CHARLES M. HUGHES.